(12) United States Patent  
Matsubara et al.

(10) Patent No.: US 7,556,665 B2
(45) Date of Patent: Jul. 7, 2009

(54) HONEYCOMB STRUCTURE

(75) Inventors: Reiji Matsubara, Nagoya (JP); Tetsuo Toyoshima, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 153 days.

(21) Appl. No.: 10/549,758

(22) PCT Filed: Mar. 19, 2004

(86) PCT No.: PCT/JP2004/003735

§ 371 (c)(1),
(2), (4) Date: Oct. 6, 2006

(87) PCT Pub. No.: WO2004/096414

PCT Pub. Date: Nov. 11, 2004

(65) Prior Publication Data

US 2007/0125053 A1 Jun. 7, 2007

(30) Foreign Application Priority Data

Mar. 19, 2003 (JP) .............................. 2003-076403

(51) Int. Cl.
*B01D 24/00* (2006.01)
*B01D 39/06* (2006.01)
*B01D 39/14* (2006.01)
(52) U.S. Cl. ............................... 55/523; 55/522; 55/524
(58) Field of Classification Search ............ 55/522–524
See application file for complete search history.

(56) References Cited

U.S. PATENT DOCUMENTS

| 4,363,644 | A | * | 12/1982 | Sato et al. ..................... 55/523 |
| 4,953,627 | A | * | 9/1990 | Ito et al. ........................ 165/8 |
| 5,454,947 | A | * | 10/1995 | Olapinski et al. ......... 210/510.1 |
| 6,669,751 | B1 | * | 12/2003 | Ohno et al. .................... 55/523 |
| 6,673,414 | B2 | * | 1/2004 | Ketcham et al. ............. 428/116 |
| 7,087,286 | B2 | * | 8/2006 | Hijikata ...................... 428/116 |
| 7,112,233 | B2 | * | 9/2006 | Ohno et al. .................... 55/523 |
| 7,138,002 | B2 | * | 11/2006 | Hamanaka et al. ............ 55/523 |
| 7,294,316 | B2 | * | 11/2007 | Harada et al. ................ 422/180 |
| 2002/0038536 | A1 | * | 4/2002 | Best et al. ................... 55/282.3 |
| 2002/0197193 | A1 | * | 12/2002 | Harada et al. ................ 422/177 |
| 2003/0000188 | A1 | * | 1/2003 | Harada et al. ................. 55/523 |
| 2004/0206044 | A1 | * | 10/2004 | Kondo et al. ................ 52/782.1 |
| 2004/0211164 | A1 | * | 10/2004 | Hamanaka et al. ............ 55/523 |
| 2005/0126140 | A1 | * | 6/2005 | Ito et al. ....................... 55/523 |

FOREIGN PATENT DOCUMENTS

JP U 59-47310 3/1984
JP A 03-121213 5/1991

(Continued)

*Primary Examiner*—Walter D Griffin
*Assistant Examiner*—Amber Orlando
(74) *Attorney, Agent, or Firm*—Oliff & Berridge, PLC

(57) ABSTRACT

A honeycomb structure according to an aspect of the present invention includes a segment part including a plurality of first honeycomb segments having a plurality of through holes passing through along an one axis; and a plurality of second honeycomb segments arranged in the periphery of the segment part having a plurality of through holes passing through along the one axis. A cross sectional area of the first honeycomb segments is smaller than the cross sectional area of the second honeycomb segments in the cross section perpendicular to the one axis.

12 Claims, 9 Drawing Sheets

FOREIGN PATENT DOCUMENTS

| | | |
|---|---|---|
| JP | A 2001-190916 | 7/2001 |
| JP | A 2002-301325 | 10/2002 |
| WO | WO-02079618 * | 10/2002 |
| WO | WO-03011427 A1 * | 2/2003 |
| WO | WO-03021089 A1 * | 3/2003 |

* cited by examiner (PRIOR ART)

(PRIOR ART)

(PRIOR ART)

US 7,556,665 B2

HONEYCOMB STRUCTURE

TECHNICAL FIELD

The present invention relates to a honeycomb structure applied to a diesel particulate filter (DPF) or the like for trapping and removing particulates included in exhaust gas discharged from a diesel engine or the like.

BACKGROUND ART

A honeycomb structure 100 used as a DPF is formed by bonding and integrating a plurality of honeycomb segments 200 having the same shape and size by a bonding material 900, forming into a predetermined shape such as a circular cross section, and covering the exterior with a coating layer 400, as shown in FIG. 1A. This honeycomb structure 100 is located in an exhaust system of a diesel engine and used for purifying exhaust gas.

As shown in FIGS. 1B and 1C, each of the honeycomb segments 200 is made of a silicon carbide porous material having a plurality of through holes 500 separated from each other by porous partition walls 600. The through holes 500 pass through the honeycomb segment 200 along a one axis. One side ends of the through holes 500 are sealed alternately with a sealing material 7. On the other hand, the other side end of the through holes 500 not sealed is sealed. In other words, a certain through hole 500 has a left end open while a right end is sealed with the sealing material 7. Other through hole 5 adjacent to the certain through hole 500 has the left end sealed with the sealing material 7 and the right end open. With such a structure, as indicated by arrows in FIG. 1C, exhaust gas entered into the through hole 500 having the left side open passes through the porous partition walls 600 and flows out from the other through holes 500. In addition, the exhaust gas may be purified since the partition walls 600 trap particulates in the exhaust gas when the gas passes through the partition walls 600.

As the bonding material 900 bonding the honeycomb segments 200, a material is available, adding an inorganic fiber such as ceramic fiber, an organic or inorganic binder, and a dispersion medium such as water to a ceramic powder equivalent to component substances of the honeycomb segments 200. Generally, in order to suppress temperature rise in the honeycomb segments 2 when regenerating the honeycomb structure 100, the bonding material 900 having a larger heat capacity than the honeycomb segments 2 is used.

Using the honeycomb structure 100 continuously, soot deposits on the partition walls 600 and pressure loss increases over time. Such increase of the pressure loss causes degradation in performance of the engine. Therefore, regeneration of the honeycomb structure 100 is performed by burning and removing deposited soot.

The regeneration is performed by heating the honeycomb structure 1 to approximately 550 to 600 degrees Centigrade while the automobile is moving. Through this heating, the soot burns and heats itself, thereby raising the temperature of the entire honeycomb structure 100. Due to this temperature rise, an excessive temperature gradient occurs in the central part of the honeycomb segments, particularly near the center of a cross section of the honeycomb structure 100, the cross section is perpendicular to the through hole length (along the axis). Therefore, it arises a state that cracks caused by thermal stress are easily generated.

To solve these problems, in the prior art described above, the bonding material 900 bonding the honeycomb segments 200, which has a large heat capacity, is used for suppressing the temperature rise in the honeycomb segments 200 during regeneration and suppressing generation of cracks. In addition, a configuration is under review, in which layers of the bonding material 900 having a large heat capacity are located in the central part of the honeycomb structure 100 where the cracks are easily generated, and the temperature gradient in the central part is suppressed.

Amount of soot that allows regeneration of the honeycomb structure without generating cracks is called 'maximum soot amount for regeneration' of the honeycomb structure. It is preferable that the 'maximum soot amount for regeneration' is greater, since frequency of regeneration may be decreased.

The honeycomb structure in which the bonding material 900 is located in the center of the honeycomb structure, that is, the honeycomb structure in which the honeycomb segments 200 are located so that the layers of the bonding material 900 are crossing in the center of honeycomb structure 100, may suppress the generation of the cracks effectively and increase 'maximum soot amount for regeneration', compared to the honeycomb structure in which the honeycomb segments 200 are located so that the through holes are located in the center, that is, the honeycomb structure in which the layer of bonding material 900 is located in the part shifted from the center. Therefore, it is possible to perform the regeneration in the state that more soot is deposited, by locating the layers of the bonding material 900 in the central part of the honeycomb structure 100.

However, according to recent specific honeycomb structures for automobile, due to structural restriction in the automobile at installation locations, a shape of the section perpendicular to an axis is not limited to a symmetrical shape such as a circle (the honeycomb structure shown in FIG. 1A) or a square, and structures having irregular shape of cross sections, difficult to determine the center, are increasing.

In a honeycomb structure having such irregular shape of cross section, it is not easy to adjust the position of the honeycomb segments so that the layers of bonding material 900 are arranged in the center, since it is difficult to determine the center.

Furthermore, increasing the amount of the bonding material 900 in the honeycomb structure by increasing the thicknesses of the layer of the bonding material causes increase in heat capacity, thereby suppressing temperature rise and temperature gradient in the central part during the regeneration. However, increasing the amount of the bonding material 900 causes increase in the cross sectional areas of the layers of the bonding material 900, resulting in relative decrease in the total cross sectional areas of the honeycomb segments. Accordingly, the total volume of the through holes reduces, and capacity of removing the soot reduces. Therefore, simply increasing the amount of the bonding material 900 does not effectively increase the 'maximum soot amount for regeneration'.

DISCLOSURE OF THE INVENTION

An object of the present invention is to provide a honeycomb structure, which is capable of increasing a maximum soot amount for regeneration without consideration of the location of layers of bonding material in a cross section perpendicular to an axis.

To attain the foregoing object, a honeycomb structure according to an aspect of the present invention includes (i) a segment part including a plurality of first honeycomb segments bonded together by a bonding material, the plurality of first honeycomb segments having a plurality of through holes passing through along an one axis and being separated by partition walls; and (ii) a plurality of second honeycomb segments arranged in the periphery of the segment part in a cross section perpendicular to the one axis, bonded and integrated with the segment part, having a plurality of through holes passing through along the one axis and being separated by partition walls. A cross sectional area of the first honeycomb segments is smaller than the cross sectional area of the second honeycomb segments in the cross section perpendicular to the one axis.

BEST MODE FOR CARRYING OUT THE INVENTION

Figure 1A:
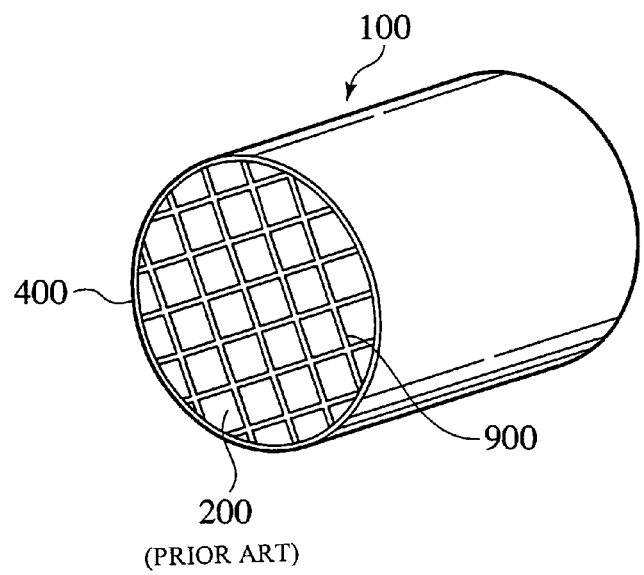
FIG. 1 is a perspective view showing a basic configuration of a conventional honeycomb structure.
FIGS. 1B and 1C are a perspective view and a cross sectional view of a basic configuration of the conventional honeycomb structure, respectively.
Figure 1B:
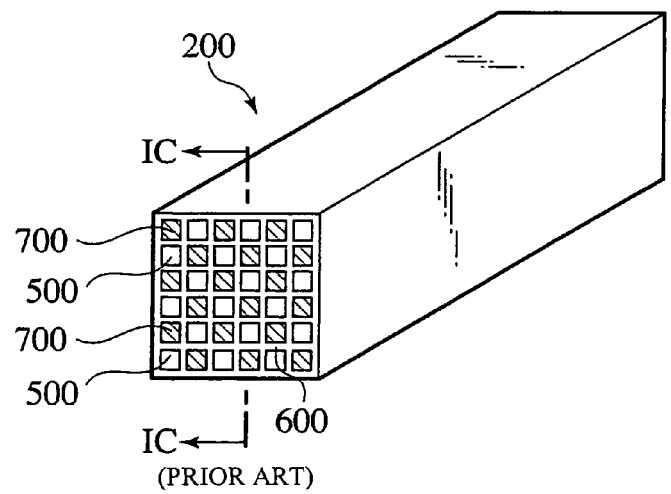
Figure 1C:
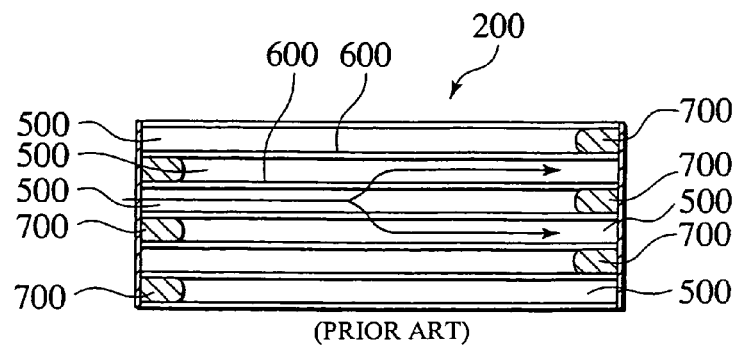

A honeycomb structure according to an embodiment of the present invention is shown in FIG. 1B. As with the conventional honeycomb structure, it has a configuration in which a plurality of honeycomb segments are bonded to each other via a bonding material. In addition, as shown in FIGS. 1B and 1C, the respective honeycomb segments have a plurality of through holes passing therethrough along an axis and separated by porous partition walls, where one side ends of adjacent through holes are sealed alternately with a sealing material.

Figure 2A:
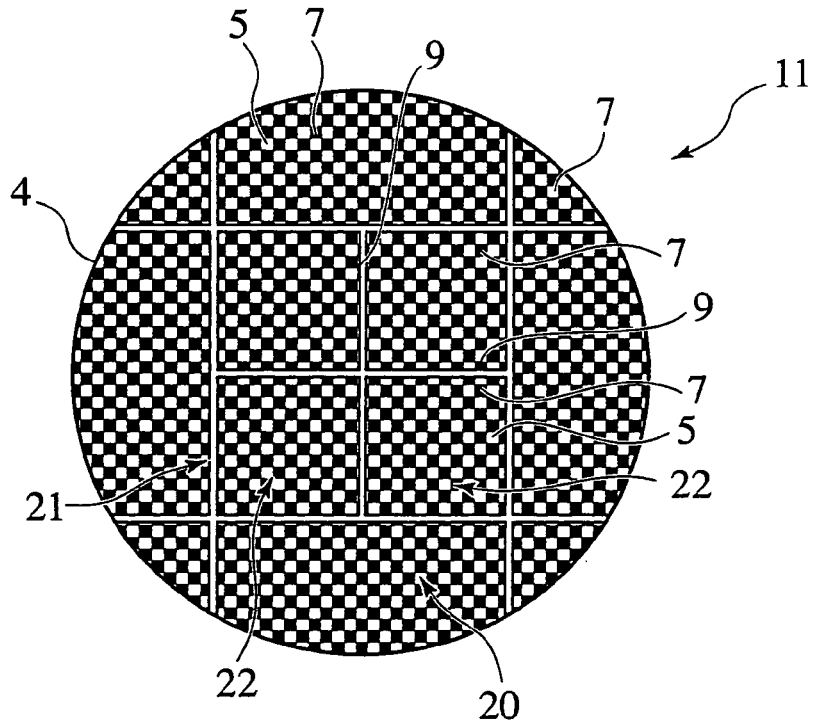
FIG. 2A is a cross sectional view of a honeycomb structure according to an embodiment of the present invention.
Figure 2B:
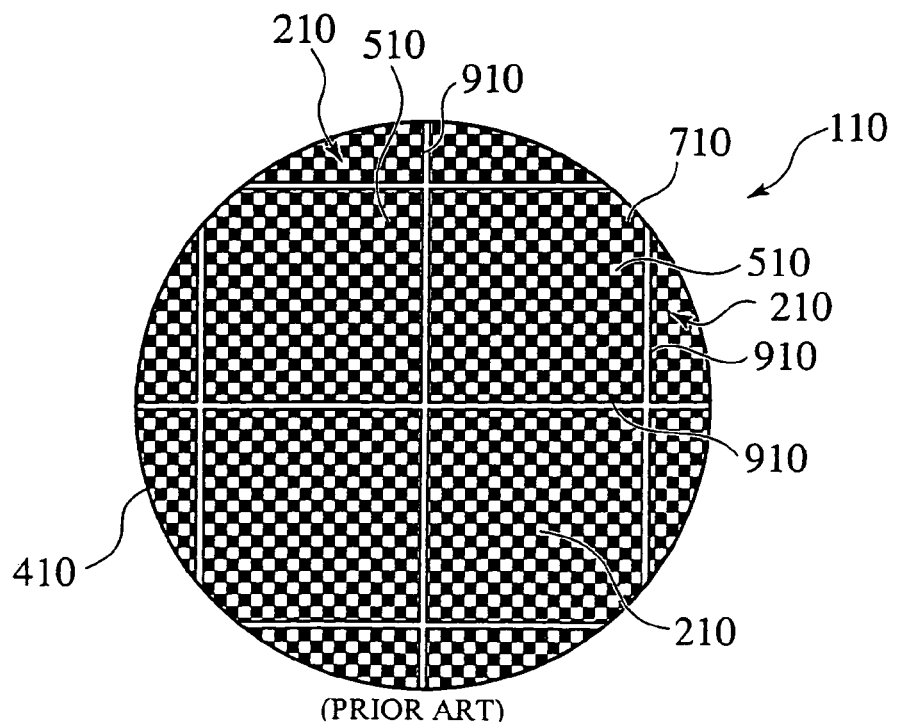
FIG. 2B is a cross sectional view of a honeycomb structure having a conventional configuration.

FIG. 2A shows a cross section of a honeycomb structure 11 according to this embodiment perpendicular to the length of the axis ('cross section' hereafter refers to a cross section perpendicular to the axis.) FIG. 2B shows a cross section of a honeycomb structure 110 having the conventional configuration for reference.

The honeycomb structure 11 according to this embodiment shown in FIG. 2A is made up of a plurality of honeycomb segments bonded to each other by a bonding material 9, and is constituted by two types of honeycomb segments 20 and 22 differing in size, which is different from the conventional honeycomb structure 110 shown in FIG. 2B constituted by a plurality of honeycomb segments 210 of the same shape and size. The honeycomb segments 22 (first honeycomb segments) arranged in a segment part 21 centrally arranged have smaller cross sectional areas than the honeycomb segments 20 (second honeycomb segments) deployed in the periphery of the segment part 21.

The conventional honeycomb structure 110 is made up of the same-sized honeycomb segments 210 having square cross sections with 30 to 40 mm, typically 35 mm sides bonded to each other with a bonding material 910 and integrated into one body, processed so that the cross section of the honeycomb structure 110 is a circle, and the circumference thereof coated with a coating layer 410.

In contrast, the honeycomb structure 11 according to this embodiment of the present invention is formed by the segment part 21 constituted by at least the honeycomb segments 22 having smaller cross sectional areas than the honeycomb segments 210 used in the conventional configuration, as shown in FIG. 2A. For example, the honeycomb segments 22 are bonded to each other with the bonding material 9 and have small square cross sections equivalent to a quarter of the square cross section of the segment part 21 and have almost the same areas as the honeycomb segments 20 in the periphery. Note that respective adjacent honeycomb segments are bonded to each other with the bonding material 9, where the thickness of each of the bonding material 9 layers is kept almost constant.

The honeycomb structure 11 is formed so that the cross sectional outer shape is a circle, and the coating layer 4 covers the outer surface.

With the honeycomb structure 11 according to this embodiment, since the segment part 21 deployed near the center of the cross section in this manner is formed of a plurality of honeycomb segments 22 with small cross sectional areas, the cross sectional areas of the bonding material layers needed for bonding the respective honeycomb segments 22 to each other relatively increase and amount of the bonding material 9 increases in the segment part 21. Heat capacity in the central part is generally large due to a high specific heat and a high density of the bonding material 9, and the temperature gradient during regeneration reduces due to the small cross sectional areas of the honeycomb segments 22. This allows reduction in thermal stress in the segment part 21 during regeneration of the honeycomb structure 20, and regeneration at a high temperature. Therefore, regeneration becomes possible in a state with a large amount of soot deposit, allowing increase in maximum soot amount for regeneration and reduction in regeneration frequency.

Furthermore, with the honeycomb structure 11 according to this embodiment, since the honeycomb segments 20 deployed in the periphery of the segment part 21 have larger cross sectional areas per unit than the honeycomb segments 210 constituting the conventional honeycomb structure 110, the cross sectional areas of the bonding material 9 layers are relatively smaller. Therefore, increase in the areas of the bonding material layers can be suppressed, and the total area of the through holes 5 cannot reduce more than necessary for the honeycomb structure as a whole. As a result, exhaust gas pressure loss may be kept low, and purification of exhaust gas may be consistently carried out.

Note that the main component of the honeycomb segments used in the embodiments of the present invention is not particularly limited, and the same material as that conventionally used is available. Cordierite, mullite, alumina, spinel, silicon carbide, a composite material of silicon carbide-cordierite, a composite material of silicon-silicon carbide, silicon nitride, lithium aluminum silicate, aluminum titanate, a Fe—Cr—Al type metal, and the like are some available examples. Use of a composite material of silicon-silicon carbide is particularly favorable from the viewpoint of strength and heat resistance.

Furthermore, the cross sectional shape of the honeycomb structure is not particularly limited to the circle shown in FIG. 2A, and various forms such as an ellipse, a racetrack, a regular polygon, or other irregular shapes may be employed.

The material for the bonding material is not particularly limited, and is fabricated by adding water to inorganic particles, an inorganic binder aqueous solution, and oxide fibers. Furthermore, clay or an organic binder may be added as needed. The inorganic particles serve as an aggregate, and the inorganic binder serves as a binding material. As the inorganic particles, for example, ceramics selected from the group consisting of silicon carbide, silicon nitride, cordierite, alumina, mullite, zirconia, zirconium phosphate, aluminum titanate, titania and combinations thereof, a Fe—Cr—Al based metal, a nickel-based metal, or a composite material of metallic silicon (Si)— silicon carbide (SiC) may be suitably used. It is preferable to have superior heat resistance, excellent thermal conductivity, and approximately the same thermal expansion coefficient as the honeycomb segment material, where use of silicon carbide is most suitable. In addition, as the inorganic binder, a colloidal sol oxide or an aqueous solution such as a silica sol or an alumina sol may be used. As the oxide fibers, ceramic fibers such as aluminosilicate, mullite, silica, alumina or the like may be suitably used.

Note that in order to lower the thermal gradient according to location in the honeycomb structure occurring when regenerating the honeycomb structure, having a high specific heat and excellent thermal conductivity are preferred. For example, the thermal conductivity of the bonding material is preferably 0.1 to 5 W/mK. The specific heat is preferably 570 to 770 J/kg·K.

Furthermore, the thickness of each of the bonding material layers bonding the respective honeycomb segments to each other is preferably 0.5 to 3 mm, more preferably 0.5 to 1.5 mm. This is because the bonding material layers having a thickness of 0.5 mm or less barely control the temperature gradient and thus if the bonding material layers having a thickness of 3 mm or greater, which is thick, are used instead, the areas of the respective through holes relatively decrease, thereby increasing exhaust gas pressure loss.

Figure 3A:
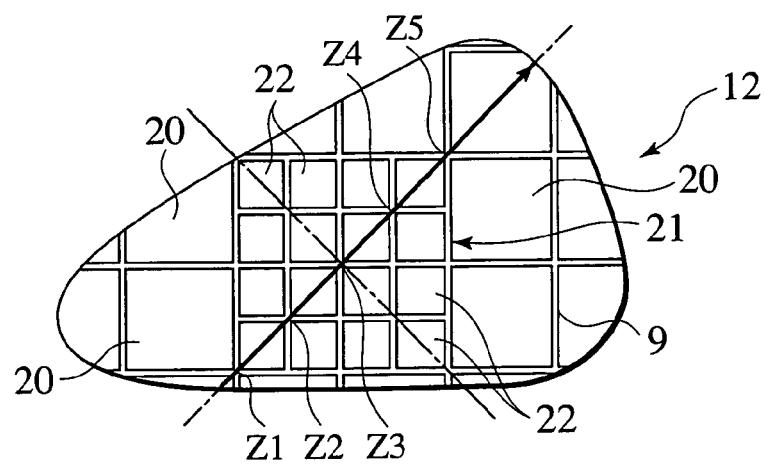
FIG. 3A is a cross sectional view of a honeycomb structure having an irregular shaped cross section according to an embodiment of the present invention.

A honeycomb structure 12 according to another embodiment of the present invention is described forthwith. As shown in FIG. 3A, the honeycomb structure 12 has an irregular shaped cross section, and comprises a segment part 21, which includes a plurality of honeycomb segments 22 with small cross sectional areas and is deployed near the center, and honeycomb segments 20 having larger cross sectional areas than the honeycomb segments 22 deployed in the periphery of the segment part 21, as with the honeycomb structure 11 shown in FIG. 2A.

Note that the honeycomb structure 12 with such irregular shaped cross section is used for preventing contact with other peripheral devices deployed near the structure when installed in an automobile, for example. The honeycomb structure according to this embodiment takes various forms depending on the environment of a part in which the structure is to be deployed as well as the cross sectional shape shown in FIG. 3A.

Influence on temperature gradient during regeneration of the honeycomb structure, which includes segment part 21 made up of a plurality of honeycomb segments 22 having small cross sectional areas, is described below.

Note that the honeycomb segments 20 have square cross sections with 35 mm sides. The segment part 21 includes the honeycomb segments 22 having cross sectional shapes equivalent to a quarter of a square cross section almost equal in size to the honeycomb segments 20, and sixteen of the honeycomb segments 22 are bonded to each other with the bonding material 9.

Figure 3B:
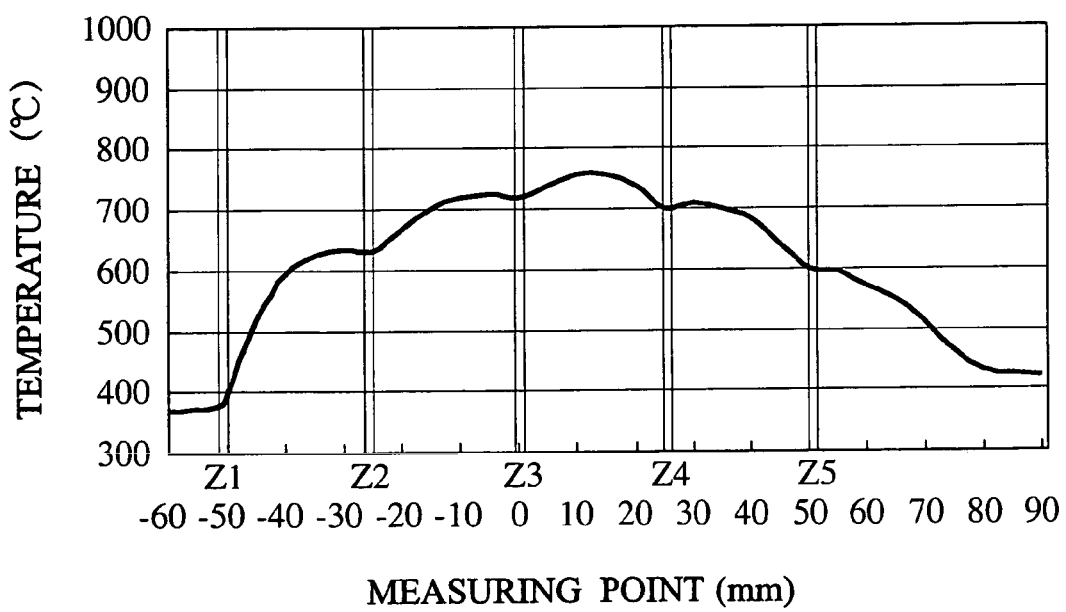
FIG. 3B is a graph showing a temperature distribution measured during regeneration of this honeycomb structure.

FIG. 3B is a graph showing a temperature distribution obtained while regenerating the honeycomb structure 12. The horizontal axis (measuring locations) in FIG. 3B corresponds to points specified by the solid arrow shown in FIG. 3A. Z1 through Z5 in FIG. 3B correspond to intersections Z1 through Z5 of the bonding material 9 layers shown in FIG. 3A. A point Z3 intersected by the solid line and the dashed line is a reference point.

Figure 4A:
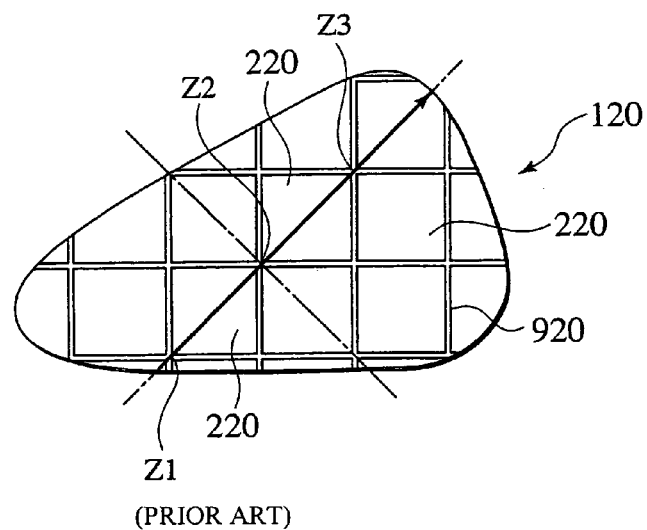
FIG. 4A is a cross sectional view of a conventionally configured honeycomb structure having an irregular shaped cross section.
Figure 4B:
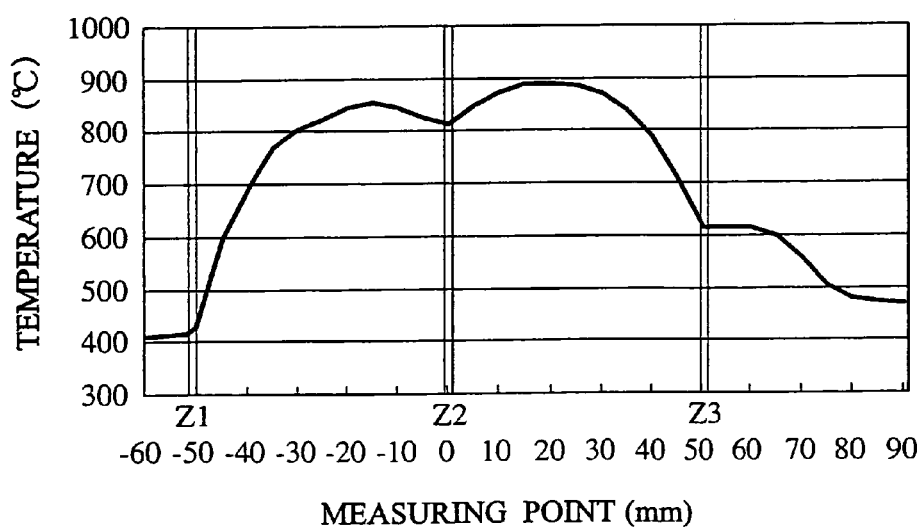
FIG. 4B is a graph showing a temperature distribution measured during regeneration of this honeycomb structure.

Note that for reference, a temperature distribution obtained during regeneration of the conventional honeycomb structure 120 having the same irregular shaped cross section as shown in FIG. 4 is given in FIG. 4B.

The conventional honeycomb structure 120 is made up of the same sized honeycomb segments 220 having a square cross section with 35 mm sides bonded to each other with a bonding material 920 and integrated into one body. Z1 through Z3 in FIG. 4B correspond to intersections Z1 through Z3 of the bonding material 920 layers shown in FIG. 4A.

As shown in FIGS. 3B and 4B, when soot is burned for regeneration, temperature rises in the honeycomb structures 12 and 120 due to self-heating resulting from soot combustion. In this case, the temperature in parts where the bonding materials (9 and 920) exist reduces to a certain extent due to the heat capacity of the bonding materials (9 and 920). Temperature in the central part of both of the honeycomb structures 12 and 120 becomes high. The temperature gradient occurring between the central portion and the periphery of the conventional honeycomb structure 120, which are constituted by only the honeycomb segments 220, is steep. In contrast, the honeycomb structure 12 according to this embodiment having the segment part 21 constituted by the honeycomb segments 22 with small cross sectional areas apparently provides a gradual temperature gradient.

This is because there is a large amount of the bonding material 9 in the central portion for bonding the honeycomb segments 22 to each other, and thus the heat capacity in the central portion is high, and the cross sectional areas of the honeycomb segments 22 are small. Such a gradual temperature gradient provides a small thermal stress on the segment part 21 during regeneration, thereby suppressing crack generation. Furthermore, as a result, since an allowable soot temperature range for regeneration increases to be higher, an allowable deposited amount of soot for regeneration can increase by an amount equivalent to that amount of increase in the allowable soot temperature range. This allows increase in maximum soot amount for regeneration and reduction in regeneration frequency.

With the honeycomb structure according to this embodiment, the segment part 21 is deployed in the center, but the cross sectional central position need not be precisely located. Therefore, the configuration according to this embodiment may easily be applied even to the honeycomb structure having an irregular shaped cross section in which specifying the central position is difficult.

Relationships between cross sectional shapes of honeycomb segments and corresponding pressure losses are described forthwith, where the honeycomb segments are deployed in the segment part 21, which exists in the center of the honeycomb structure according to this embodiment, and the periphery thereof, respectively.

Figure 5A:
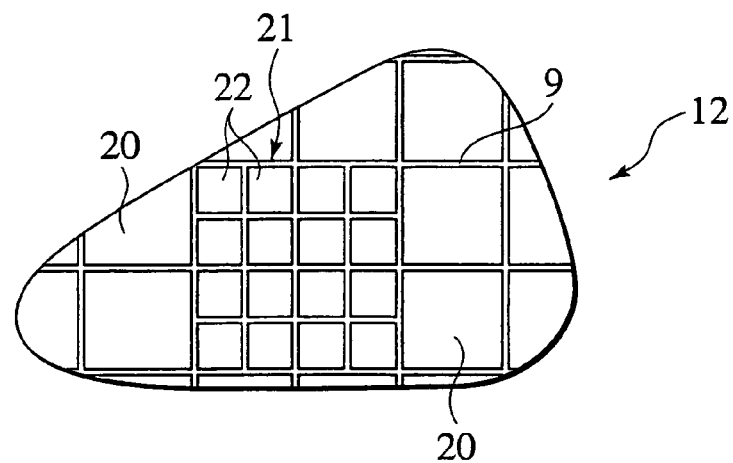
FIGS. 5A through 5C show cross sectional view of three types of honeycomb structures, respectively, wherein the FIGS. 5A and 5B correspond to the honeycomb structure according to the present embodiment.
Figure 5B:
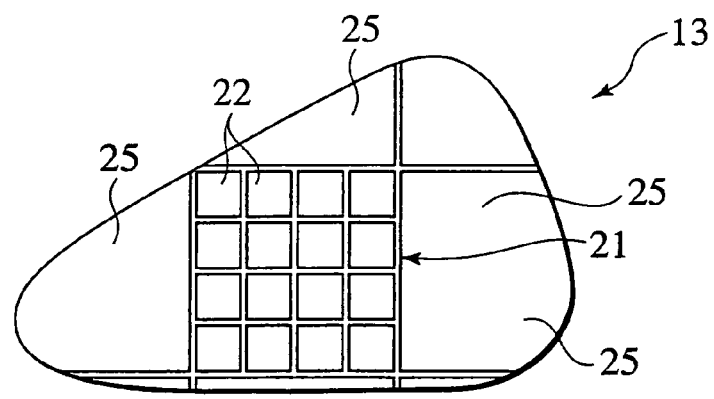
Figure 5C:
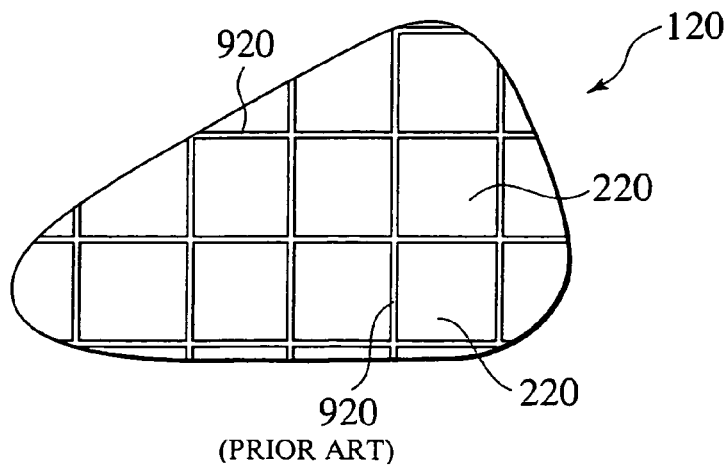

FIGS. 5A through 5C show exemplary arrangements of honeycomb segments in honeycomb structures having the same irregular shaped cross section, respectively. Note that honeycomb structures 12 and 13 shown in respective FIGS. 5A and 5B are the honeycomb structures according to the embodiments of the present invention, and FIG. 5C shows the honeycomb structure 120 having the conventional configuration.

FIG. 5A shows the same structure as the honeycomb structure 12 shown in FIG. 3A, which is constituted by the honeycomb segments 20 having square cross sections with 35 mm sides in the periphery as with the conventional honeycomb segments 20, and sixteen honeycomb segments 22 having shapes equivalent to a quarter of the 35 mm-sided square cross section arranged in the segment part 21. FIG. 5B shows the honeycomb structure 13 including the same part as the segment part 21 shown in FIG. 5A and honeycomb segments 25 having square cross sections with 4× the dimensions of the above-given unit shape in the periphery. FIG. 5C shows the same structure as the honeycomb structure 120 shown in FIG. 4A, which is constituted by a plurality of same-shaped honeycomb segments 220 having square cross sections with 35 mm sides deployed throughout.

Figure 6:
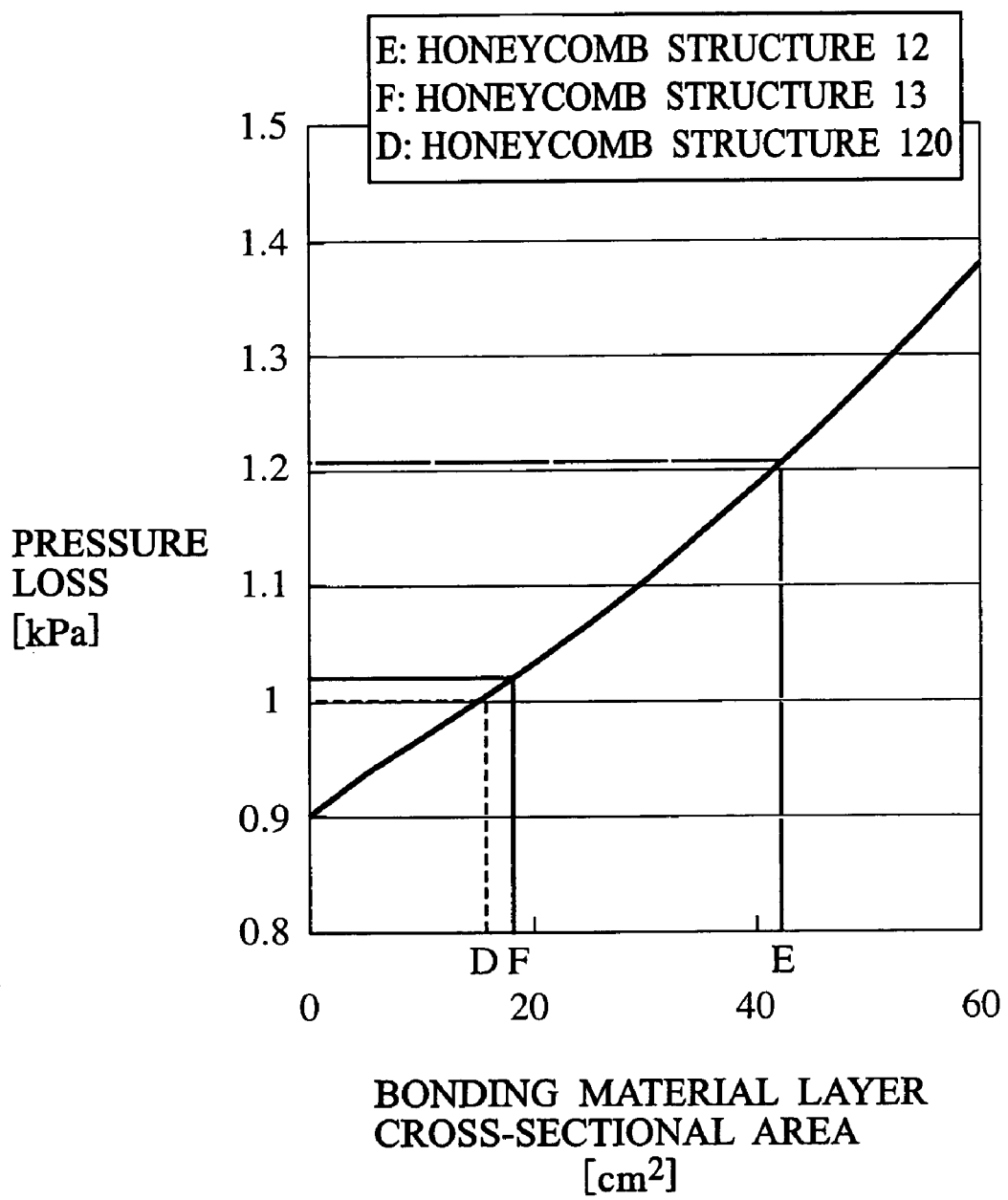
FIG. 6 is a graph showing a relationship between bonding material layer cross sectional areas and pressure, according to the honeycomb structures shown in FIGS. 5A through 5C.

FIG. 6 is a graph showing relationships between bonding material layer cross sectional areas and corresponding pressure losses of the honeycomb structures having the same irregular shaped cross section shown in FIGS. 5A through 5C. Increase in the cross sectional areas of the bonding material layers corresponds to reduction in the opening areas of each of the honeycomb segments or total cross sectional area of the exhaust gas through holes. Accordingly, as shown in the graph of FIG. 6, the increase in the cross sectional areas of the bonding material layers leads to pressure loss of the exhaust gas passing through the entire honeycomb structure.

Difference in structure among the cross sections of the honeycomb structures shown in FIGS. 5A and 5B bring about difference in total cross sectional area among the bonding material layers (9 and 920). In the graph of FIG. 6, point D corresponds to the cross sectional area of the bonding material in the conventional honeycomb structure 120, point E corresponds to cross sectional area of the bonding material in the honeycomb structure 12, and point F corresponds to cross sectional area of the bonding material in the honeycomb structure 13. Compared to the conventional honeycomb structure 120 of FIG. 5C, the honeycomb structure 12 shown in FIG. 5A includes the bonding material layers having larger cross sectional areas, which brings about a larger pressure loss. On the other hand, the honeycomb structure 13 of FIG. 5B provides increase in pressure loss of approximately 2% at most relative to the pressure loss in the conventional honeycomb structure 120.

This is because the periphery of the segment part 21 including the honeycomb segments 22 with small cross sectional areas is constituted by the honeycomb segments 25 having larger cross sectional areas than those of the honeycomb segments 210, which constitute the conventional honeycomb structure 120, thereby decreasing the cross sectional areas of the bonding material 9 layers in the periphery of the segment part 21, increasing amount of the exhaust gas passing through this area, and resulting in allowing compensation for the pressure loss of the exhaust gas passing through the entire honeycomb structure. As a result, exhaust gas may be favorably introduced into the honeycomb structure, allowing purification thereof.

As such, with the honeycomb structure according to this embodiment, it is preferable to form the segment part 21 with a plurality of honeycomb segments having small cross sectional areas, and set the cross sectional dimensions of the honeycomb segments deployed in the periphery thereof so as to compensate for the pressure loss of the exhaust gas passing through the entire honeycomb structure. Note that the cross sectional shape that allows compensation for the pressure loss throughout the entire honeycomb structure is not limited to the forms shown in the drawings, and various modifications are possible.

As described above, compensation for pressure loss refers to suppress reduction in the total pressure loss, which has increased due to the conventional honeycomb structure, by deploying honeycomb segments having small cross sectional areas in the segment part 21 and thereby enlarging the cross sectional area of the periphery of the honeycomb segments. More specifically, assuming that the pressure loss occurring when the conventional honeycomb structure or a honeycomb structure is made by bonding together only honeycomb segments having square cross sections with 30 to 40 mm, typically 35 mm sides, is 100%, it is preferable that the compensation for pressure loss should be carried out by adjusting the cross sectional areas of the respective honeycomb segments so as to at least keep the increase in total pressure less of the honeycomb structure approximately 20% or below, more preferably 5% or below.

The cross sectional area of the segment part 21 depends on size and cross sectional shape of the entire honeycomb structure, and is preferably approximately ⅓ to ⅔, more preferably ⅓ to ½ of the total cross sectional area of the honeycomb structure. This is because there is little control of the thermal gradient occurring when regenerating the honeycomb structure when ⅓ or less, and adjustment to compensate for pressure loss when ⅔ or greater is difficult.

Furthermore, the cross sectional areas of the honeycomb segments 22 formed in the segment part 21 are preferably smaller than those of the conventional honeycomb segments 210 having square cross sections with 30 to 40 mm, typically 35 mm sides, and the cross sectional shapes of honeycomb segments formed in the periphery of the segment part 21 are preferably adjusted to allow compensation for the above-mentioned pressure loss. More specifically, the cross sectional areas of the honeycomb segments formed in the periphery of the segment part 21 are preferably equal to or greater than those of the conventional honeycomb segments 210 or the square area with 30 to 40 mm, typically 35 mm sides. Moreover, the cross sectional areas of the honeycomb segments formed in the periphery of the segment part 21 are preferably 4×, more preferably 10×, even more preferably 16× the cross sectional areas of the honeycomb segments formed in the segment part 21.

Furthermore, in order to make the integration process easier when bonding the honeycomb segments to each other, it is preferable that the cross sectional shape of each of the honeycomb segments is oblong, more preferably square, so that the length of a side of the cross section of the respective honeycomb segments 25 is roughly an integral a plurality of the sum of the thicknesses of the bonding material layers and the length of a side of the cross section of the respective honeycomb segments 22.

WORKING EXAMPLES

Working Example 1, Comparative Example

Figure 7A:
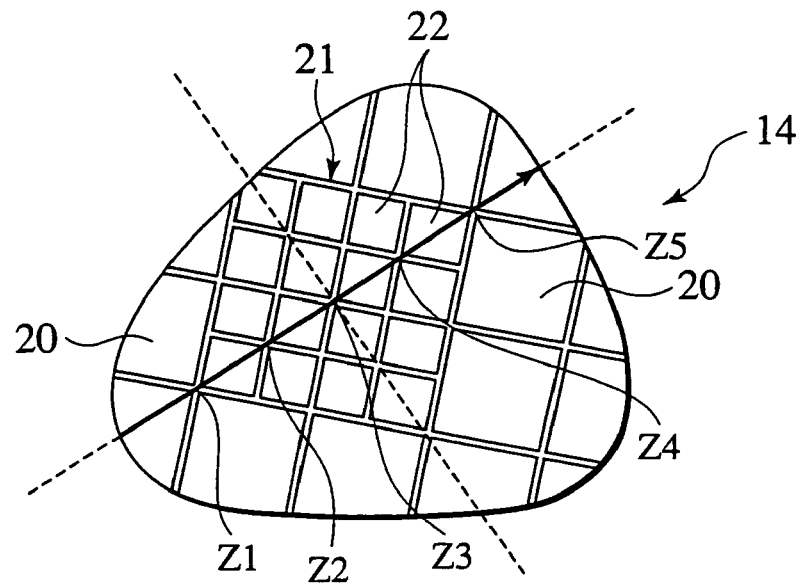
FIG. 7A is a cross sectional view of a honeycomb structure of a working example 1.
Figure 7B:
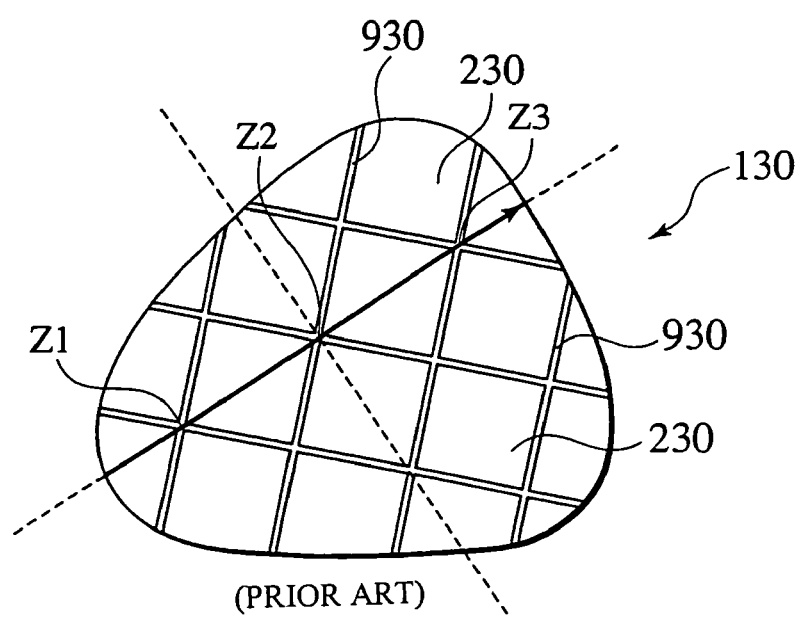
FIG. 7B is a cross sectional view of a honeycomb structure of a comparative example.

FIG. 7A shows a cross section of a honeycomb structure 14 of a working example 1, and FIG. 7B shows a cross section of a honeycomb structure 130 of a comparative example.

With the honeycomb structure 14 of the working example 1, sixteen honeycomb segments 22 having square cross sections with 17 mm sides are arranged in a segment part 21, and eighteen honeycomb segments 20 having square cross sections with 35 mm sides are arranged in the periphery of the segment part 21. The honeycomb segments 20 and 22 have respective lengths of 254 mm, and are bonded to each other with a bonding material 9 and integrated into a single body. In addition, the honeycomb structure 14 has a circumference processed into an irregular cross sectional shape, as shown in FIG. 7A. The honeycomb structure 130 of the comparative example is processed into the same irregular cross sectional shape as that in the working example 1, where eighteen honeycomb segments 230 having a length of 254 mm and square cross sections with 35 mm sides are bonded to each other with the bonding material 930 made of a ceramic cement.

Table 1 shows characteristics of the honeycomb segments and the bonding material used in the working example 1 and the comparative example. Note that the honeycomb structures are fabricated under the following conditions.

TABLE 1

| Honeycomb Segments | Material Composition | SiC: 80%, Si: 20% |
|---|---|---|
| | Porosity | 52% |
| | Average Pore Diameter | 20,, m |
| | Thermal Conductivity | 20 W/m · K |
| | Specific Heat | 670 J/kg · K |
| | Density | 1450 kg/m³ |
| | Cell Structure | 12 mil/300 cpsi |
| Ceramic Segments | Thermal Conductivity | 1 W/m · K |
| | Specific Heat | 650 J/kg · K |
| | Density | 1700 kg · m³ |

<Fabrication Conditions for Honeycomb Segments>

As a honeycomb segment raw material, a SiC powder and a metallic Si powder are mixed together at a mass ratio of 80:20, a starch and a plastic foam are added as hole-forming materials, methylcellulose, hydroxypropoxy methylcellulose, a surface active agent, and water are further added, fabricating a flexible clay. This clay is extruded, formed, and then dried using microwaves and hot air to provide a formed honeycomb segment having partition wall thicknesses of 0.3 mm (12 mil) and cell density of approximately 46.5 cell/cm² (300 cpsi).

This formed honeycomb segment is sealed on either side of through holes (cells) such that the ends exhibit a checkerboard pattern. In other words, adjacent cells are alternately sealed so that one-side end of a cell is sealed while the other-side end of an adjacent cell is sealed. The same material as the honeycomb segment raw material is used as a sealing material. Once through holes (cells) are sealed on either end and then dried, they are degreased at approximately 400 degrees Centigrade in atmospheric air, and fired at approximately 1450 degrees Centigrade in an Ar inert atmosphere, thereby providing honeycomb segments having a porous structure with the characteristics shown in Table 1 where Sic crystal grains are bonded together with Si.

<Preparation of Bonding Material>

The SiC powder, aluminosilicate fibers (relative density D is 2.73 g/cm³), an aqueous solution with 40% mass silica gel, and the clay are mixed together in a compositional ratio of 40:30:20:1, water is added, and then kneaded and mixed for 30 minutes by a mixer, thereby preparing a pasty bonding material.

<Bonding of Honeycomb Segments>

A process of coating the bonding material on the outer wall surface of each honeycomb segment to a thickness of approximately 1 to 2 mm and then mounting another honeycomb segment thereupon is repeatedly carried out so as to form a honeycomb segment stacked structure providing a predetermined cross sectional configuration, pressure is externally applied, the entirety is integrated into one body, and then dried for 5 hours at 200 degrees Centigrade. The circumference is cut into a cylindrical shape and applied with the coating material, thereby providing a honeycomb structure.

<Regeneration Test>

Once the honeycomb structure 14 of the working example 1 and the honeycomb structure 130 of the comparative example are respectively connected to an exhaust pipe of a diesel engine, and 8 g/L of soot is deposited by activating the diesel engine using light oil, a regeneration test is carried out.

Figure 8A:
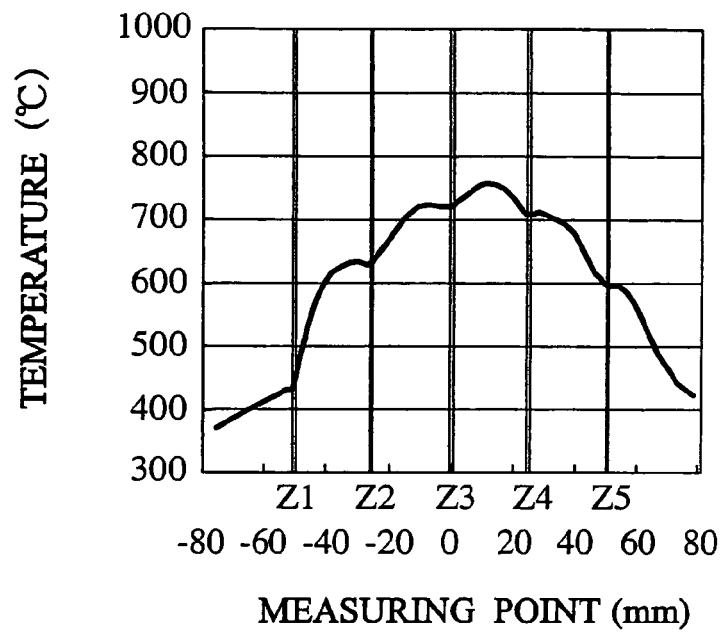
FIGS. 8A and 8B are graphs showing respective temperature distributions measured during regeneration of respective honeycomb structures of a working example 1 and a comparative example.
Figure 8B:
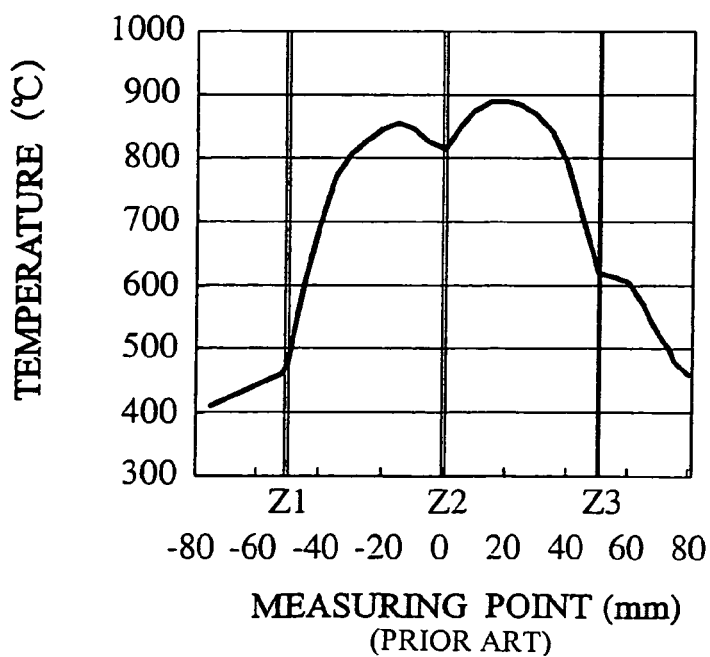

FIGS. 8A and 8B show respective temperature distributions during regeneration of the honeycomb structures 14 and 130. Note that measuring points are indicated along a solid arrow in the FIGS. 7A and 7B. Points Z1 through Z5 on the arrow in FIG. 7A correspond to Z1 through Z5 in the FIG. 8A, and indicate intersections of the bonding material layers. In addition, points Z1 through Z3 on the arrow in FIG. 7B correspond to Z1 through Z3 in the FIG. 8B, and indicate intersections of the bonding material layers. Table 2 gives maximum temperatures and maximum temperature gradients measured during regeneration.

TABLE 2

| | Working Example 1 Honeycomb Structure 14 | Comparative Example Honeycomb Structure 130 |
|---|---|---|
| Maximum Temperature (Degrees Centigrade) | 756 | 890 |
| Maximum Temperature Gradient (Degrees Centigrade/cm) | 120 | 180 |

As shown in the FIGS. 8A and 8B and Table 2, the honeycomb structure 14 of the working example 1 in which the honeycomb segments 22 having small cross sectional areas are arranged in the center has lower maximum temperature and maximum temperature gradient than the honeycomb structure 130 of the comparative example. This confirms that the honeycomb structure 50 allows improvement in maximum soot amount for regeneration.

Working Example 2

Figure 9:
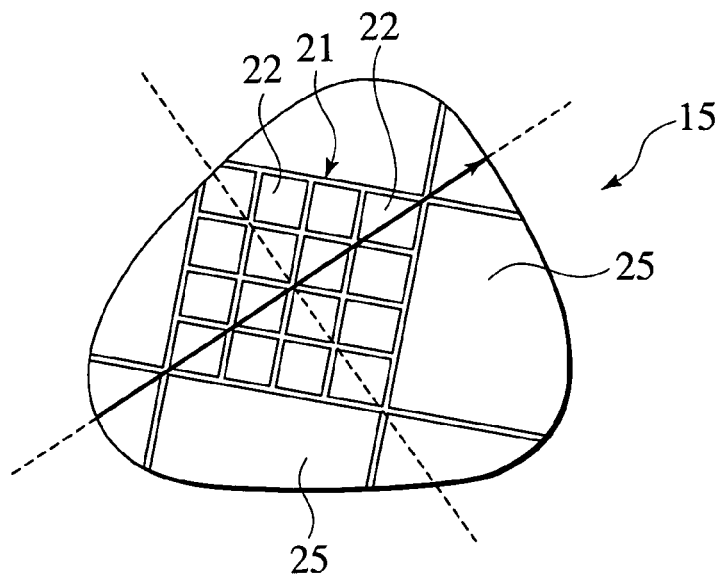
FIG. 9 is a cross sectional view of a honeycomb structure of a working example 2.

FIG. 9 shows a cross section of a honeycomb structure 15 of a working example 2. The honeycomb structure 15 is fabricated using the bonding material and the honeycomb segments having the characteristics given in Table 1, and has the same cross sectional shape and length as in the working example 1.

As shown in FIG. 9, with the honeycomb structure 15, sixteen honeycomb segments 22 having square cross sections with 17 mm sides are arranged in a segment part 21, and seven honeycomb segments 25 having square cross sections with 71 mm sides are arranged in the periphery of the segment part 21. Each of the honeycomb segments are bonded to each other with the bonding material and integrated into a single body.

The honeycomb structure 15 of the working example 2 is deployed in the initial pressure loss measuring apparatus (manufactured by NGK Insulators, Ltd.) and pressure loss is measured through measurement of pressure difference between before and after the honeycomb structure. The gas flow rate during measurement is 5 $Nm^3$/min, and the gas temperature is room temperature. For reference, pressure loss is measured under the same conditions for both the honeycomb structures 14 and 130 of the working example 1 and the comparative example, respectively.

Figure 10:
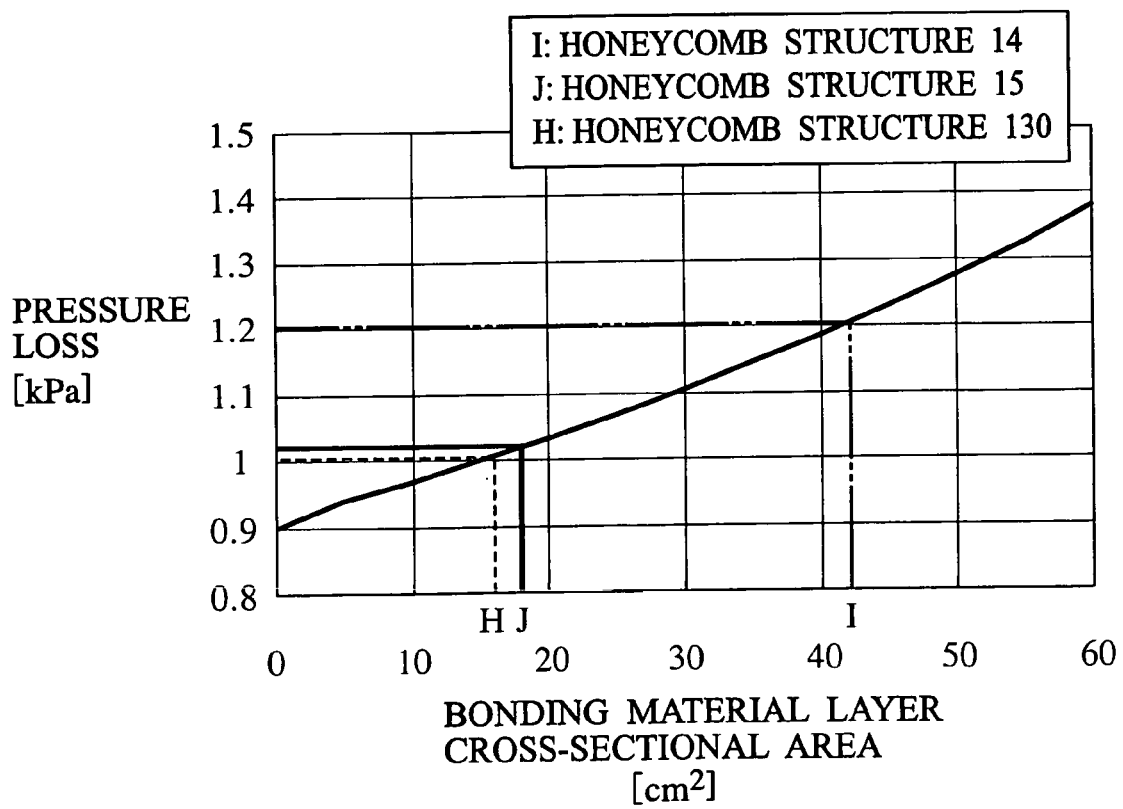
FIG. 10 is a graph showing a relationship between bonding material layer cross sectional areas and pressure losses, according to honeycomb structures of a working example 1, a working example 2 and the comparative example.

FIG. 10 shows correlation between measured pressure loss and bonding material area using the respective honeycomb structures. Point H along the horizontal axis corresponds to the bonding material layer cross sectional area of the honeycomb structure 130 of the comparative example, point I corresponds to that of the honeycomb structure 15 of the working example 2, and point J corresponds to that of the honeycomb structure 16 of the working example 1.

As is apparent from FIG. 10, it is confirmed that, in contrast to the honeycomb structure 15 of the working example 1 formed of the honeycomb segments 22 having small cross sectional areas arranged in the center exhibiting high pressure loss, the honeycomb structure 15 of the working example 2 in which the honeycomb segments 25 having large cross sectional areas with 71 mm sides are arranged in the periphery exhibits less increase in pressure loss than the honeycomb structure 130 of the comparative example, and achieving reduction in pressure loss.

As described above, according to the honeycomb structures of the present invention, since a plurality of honeycomb segments having small cross sectional areas are bonded to each other so as to form the honeycomb segments in the center, the crack generating temperature increases to a high temperature due to reduction in the temperature gradient with increasing heat capacity in the center and decreasing thermal stress during regeneration. Therefore, the maximum soot amount for regeneration may increase.

Furthermore, since locating the central position in the cross section of the honeycomb structure according to the present invention is not required, honeycomb structures having irregular shaped cross sections are also available.

Moreover, provision of cross sectional areas of the honeycomb segments arranged in the periphery of the segment part that allow compensation for pressure loss of the exhaust gas passing through the entire honeycomb structure provides a smaller total pressure loss of the honeycomb structure. This allows purification of exhaust gas in a state where soot removal capability is not impaired.

While the honeycomb structure of the present invention has been described thus far according to embodiments and working examples, the present invention is not limited to the descriptions of these embodiments and working examples, and that various modifications and variations are possible will be apparent to those skilled in the art.

The invention claimed is:

1. A honeycomb structure comprising:
   a segment part including a plurality of first honeycomb segments bonded together by a bonding material, the plurality of first honeycomb segments having a plurality of through holes passing through along an one axis and being separated by partition walls; and
   a plurality of second honeycomb segments arranged in the periphery of the segment part in a cross section perpendicular to the one axis, bonded and integrated with the segment part, having a plurality of through holes passing through along the one axis and being separated by partition walls, wherein
   a cross sectional area of the first honeycomb segments is smaller than the cross sectional area of the second honeycomb segments in the cross section perpendicular to the one axis.

2. The honeycomb structure according to claim 1, wherein, a cross sectional area of the segment part is equal to or above ⅓ and equal to or below ½ of the cross sectional area of the entire honeycomb structure in the cross section perpendicular to the one axis.

3. The honeycomb structure according to claim 1, wherein, the cross sectional area of the first honeycomb segment is smaller than a square area with 40 mm sides.

4. The honeycomb structure according to claim 1, wherein, the cross sectional area of the second honeycomb segment is larger than a square area with 30 mm sides.

5. The honeycomb structure according to claim 1, wherein, the cross sectional area of the second honeycomb segment is 4 times or greater than the cross sectional area of the fist honeycomb segment.

6. The honeycomb structure according to claim 1, wherein, a cross sectional shape of the honeycomb structure in the cross section perpendicular to the one axis is irregular.

7. The honeycomb structure according to claim 1, wherein, the cross sectional area of the first and the second honeycomb segments are adjusted that an increase of a pressure loss is equal to or less than 20%, assuming that the pressure loss of exhaust gas passing through a same shaped honeycomb structure only formed by bonding honeycomb segments having square cross sections with 35 mm side.

8. The honeycomb structure according to claim 2, wherein, the cross sectional area of the first and the second honeycomb segments are adjusted that an increase of a pressure loss is equal to or less than 20%, assuming that the pressure loss of exhaust gas passing through a same shaped honeycomb structure only formed by bonding honeycomb segments having square cross sections with 35 mm side.

9. The honeycomb structure according to claim 3, wherein, the cross sectional area of the first and the second honeycomb segments are adjusted that an increase of a pressure loss is equal to or less than 20%, assuming that the pressure loss of exhaust gas passing through a same shaped honeycomb structure only formed by bonding honeycomb segments having square cross sections with 35 mm side.

10. The honeycomb structure according to claim 4, wherein, the cross sectional area of the first and the second honeycomb segments are adjusted that an increase of a pressure loss is equal to or less than 20%, assuming that the pressure loss of exhaust gas passing through a same shaped honeycomb structure only formed by bonding honeycomb segments having square cross sections with 35 mm side.

11. The honeycomb structure according to claim 5, wherein, the cross sectional area of the first and the second honeycomb segments are adjusted that an increase of a pressure loss is equal to or less than 20%, assuming that the pressure loss of exhaust gas passing through a same shaped honeycomb structure only formed by bonding honeycomb segments having square cross sections with 35 mm side.

12. The honeycomb structure according to claim 6, wherein, the cross sectional area of the first and the second honeycomb segments are adjusted that an increase of a pressure loss is equal to or less than 20%, assuming that the pressure loss of exhaust gas passing through a same shaped honeycomb structure only formed by bonding honeycomb segments having square cross sections with 35 mm side.

* * * * *